United States Patent [19]

Piskorz et al.

[11] Patent Number: 5,496,464

[45] Date of Patent: Mar. 5, 1996

[54] HYDROTREATING OF HEAVY HYDROCARBON OILS IN SUPERCRITICAL FLUIDS

[75] Inventors: Jan Piskorz; Desmond St. A. G. Radlein; Piotr Majerski; Donald S. Scott, all of Waterloo, Canada

[73] Assignee: Natural Resources Canada, Ottawa, Canada

[21] Appl. No.: 385,676

[22] Filed: Feb. 8, 1995

Related U.S. Application Data

[63] Continuation-in-part of Ser. No. 300,470, Sep. 2, 1994, abandoned, which is a continuation-in-part of Ser. No. 412, Jan. 4, 1993, abandoned.

[51] Int. Cl.$^6$ .......................... C10G 47/34; C10G 45/00; C10G 1/06

[52] U.S. Cl. ...................... 208/108; 208/145; 208/431; 208/435

[58] Field of Search .................................. 208/106, 107, 208/112, 142, 143, 431, 434, 435, 108, 144, 145

[56] References Cited

U.S. PATENT DOCUMENTS

| | | | |
|---|---|---|---|
| 4,406,772 | 9/1983 | Sasaki et al. | 208/112 |
| 4,434,045 | 2/1984 | Vernon et al. | 208/107 |
| 4,483,761 | 11/1984 | Paspek, Jr. | 208/106 |

*Primary Examiner*—Asok Pal
*Assistant Examiner*—Bekir L. Yildirim

[57] ABSTRACT

A process is described for hydrotreating a heavy hydrocarbon oil containing a substantial portion of material which boils above 524° C. to form lower boiling materials, which comprises adding to the heavy hydrocarbon oil as solvent a paraffinic, isoparaffinic or cyclic paraffinic hydrocarbon which is also hydrogen-rich and has a critical temperature of less than 500° C. to thereby form a diluted feedstock mixture and subjecting said feedstock mixture to hydrotreating in the presence of activated carbon catalyst at a temperature and pressure substantially at or greater than the critical temperature and pressure of the solvent.

12 Claims, 2 Drawing Sheets

HYDROTREATING OF HEAVY HYDROCARBON OILS IN SUPERCRITICAL FLUIDS

CROSS-REFERENCE TO RELATED APPLICATION

This application is a continuation-in-part of U.S. application Ser. No. 08/300,470, filed Sep. 2, 1994, now abandoned, which is a continuation-in-part of U.S. application Ser. No. 08/000,412 filed Jan. 4, 1993, now abandoned.

BACKGROUND OF THE INVENTION

This invention relates to hydrocracking and, more particularly, to hydrocracking of heavy hydrocarbon oils, such as bitumen from tar sands or refinery residues, with high conversions to distillate fractions.

DESCRIPTION OF THE PRIOR ART

Hydrocracking processes for the conversion of heavy hydrocarbon oils to light and intermediate products are well known. These heavy hydrocarbon oils can be such materials as petroleum crude oil, atmospheric tar bottoms products, vacuum tar bottoms products, heavy cycle oils, shale oils, coal derived fluids, crude oil residuum, topped crude oils and heavy bituminous oils such as those extracted from tar sands.

The heavy hydrocarbon oils of the above type tend to contain nitrogenous and sulphurous compounds in quite large concentrations. In addition, such heavy hydrocarbon fractions frequently contain excessive quantities of organometallic contaminants which tend to be extremely detrimental to various catalytic processes that may be subsequently carried out, such as hydrofining. Of the metallic contaminants, those containing nickel and vanadium are most common, although other metals are often present. These metallic contaminants, as well as others, are chemically bound to the organic molecules of relatively high molecular weight which are present in the heavy hydrocarbon oils. A considerable quantity of the metal complexes is linked with asphaltenic material and contains sulphur.

Despite intensive development, hydrocracking processes for these heavy hydrocarbon oils still must achieve a compromise between high yields of lighter liquid hydrocarbons and catalyst longevity. The deactivation of metallic catalysts by coke formation and by metal deposition still remains a major problem. In most upgrading processes, e.g. hydrocracking or hydrocracking combined with hydrotreating, provision must be made for this rather rapid loss of catalyst activity. Coke precursors may be removed first by an extraction procedure. Alternatively, cheap throw away catalysts may be used. For instance, U.S. Pat. No. 4,214,977 described the use of an iron-coal catalyst which enables operation at lower pressures and higher conversions. It has also been shown in U.S. Pat. No. 4,214,977 that the addition of coal or coal-based catalyst results in a reduction of coke deposition during hydrocracking and allows operation at lower pressures, with the coal additives acting as sites for the deposition of coke precursors. The use of recirculating metallic catalysts in the form of ebullating beds is described in U.S. Pat. No. 5,013,427. Other methods involve the use of hydrogen donors. Many modifications, combinations and variations of these methods are described in the scientific and patent literature.

It is also now well established that supercritical fluids have an enhanced solubilization or extracting power for many complex organic molecules. For instance, U.S. Pat. No. 4,483,761 describes the use of supercritical fluids as a cracking medium for heavy hydrocarbon oils. A fluid which is at both a temperature and pressure exceeding its critical temperature and pressure is a supercritical fluid. A supercritical fluid exists as a form in matter in which its liquid and gaseous states are indistinguishable from one another. The critical temperature of a fluid is the temperature above which the fluid cannot be liquified by an increase in pressure. Thus, the critical pressure of a fluid is simply the vapor pressure of the fluid at its critical temperature. It has been shown that not only does the solubility of heavy materials in the supercritical fluid increase generally with temperature, but also that above the critical temperature the solubility increases with pressure, often by an order of magnitude.

The ability to solubilize heavy hydrocarbons has led to investigation of the use of supercritical conditions for hydrodenitrification and hydrodesulphurization of topped petroleum crudes, shale oils, etc. over conventional hydrotreating catalysts. In general, it has been found that desulphurization occurs readily at mild conditions, while severe conditions in high solvent dilution are required to obtain adequate levels of denitrification. Other investigations have found that the low viscosity and surface tension of supercritical fluids minimizes restrictive pore diffusion effects in hydrotreating catalysts. However, even though the hydrocracking reactions might proceed more readily in a supercritical medium, this medium has not tended to prevent catalyst deactivation by coke formation or by metal deposition.

It is the object of the present invention to accomplish in a single step reaction the conversion in high yields of heavy hydrocarbon oils to light hydrocarbon liquids, while at the same time providing extended catalyst life and a substantial degree of desulphurization, denitrification and demetalization.

SUMMARY OF THE INVENTION

According to this invention, an improved process has been developed for the conversion of heavy hydrocarbon feedstocks. This objective is achieved according to the present invention in a single reaction stage by diluting the feedstock with a hydrogen-rich solvent, operating at temperatures and pressures substantially at or in the supercritical region of the solvent mixture, with hydrogen pressures above the solvent critical pressure, and in the presence of an activated carbon catalyst.

The hydrocarbon solvent used to dilute the heavy feedstock is a hydrogen-rich solvent having a critical temperature of less than 500° C., preferably less than 450° C. A large number of hydrocarbon solvents meet this requirement and, indeed, almost any petroleum fraction with a majority of its components in the acceptable range of critical temperature and the majority of its components hydrogen-rich, may be used as the solvent. These may include, for example, paraffins or isoparaffins, such as those in the $C_8$ to $C_{20}$ range, preferably in the $C_{10}$ to $C_{16}$ range. Other suitable solvents include cyclic paraffins (naphthenes) meeting the critical temperature and hydrogen-rich requirements. As specific examples of suitable solvents according to the invention, there may be mentioned dodecane, decane, hexadecane, tetralin, decalin, etc.

The dilution ratio of feedstock to solvent is typically in the range of 20–200% by volume of solvent based on the original feed, with 25–100% by volume of solvent being preferred.

The term "heavy hydrocarbon oil" is widely used and understood in the petroleum industry and the process of the present invention applies generally to heavy hydrocarbon oils. Heavy hydrocarbon oils typically have a boiling point of at least 200° C. The process is of particular interest for heavy hydrocarbon oil feedstocks containing at least 50 volume percent of material boiling above 350° C. It has also been found to function well in feedstocks containing substantial amounts, e.g. greater than 50 volume percent of material boiling above 524° C.

The reaction temperature should be at least near and preferably above the critical temperature of the solvent, but best results are obtained if the reduced temperature ($T_R$), which is the operating temperature/critical temperature, is maintained at a value of $T_R$ of less than 1.3, preferably in the range of 0.9–1.3.

Because of the beneficial effect of higher density of the supercritical fluid on solubility of asphaltenes, the operating pressure is preferably above the solvent critical pressure, $P_C$. It has been found to be particularly advantageous to operate at a total pressure in the range of 10–20 MPa. The optimal total pressure and hydrogen partial pressure depend on the solubility of hydrogen in the solvent, the critical pressure of the solvent and its concentration in the mixture.

The reaction liquid hourly space velocity (LHSV) based on total feed volume is typically in the range of 0.1 to 10 $hr^{-1}$, depending on the reactivity of the feedstock, the operating temperature and pressure, and the degree of dilution. For most feedstocks such as bitumen or refinery residues, LHSV values of 0.5–3.0 $hr^{-1}$ are usually optimal for temperatures in the preferred range of 350° C. to 450° C. and 25–50% by volume solvent content.

The activated carbon can be used in granular form or as a carbon black in slurry form. Commercial grades of granular activated carbon with large pore diameters intended for liquid phase use are satisfactory for either packed bed or slurry reactors.

The activated carbon is preferably used without added catalytic metals, although metals such as nickel, cobalt or iron may be supported on the carbon.

It has been found that the supercritical solvent used acts as a hydrogen-rich diluent to decrease the probability of recombination and condensation of asphaltene molecules, and to enhance the degree of breakup of coke precursor "micelles" This supercritical solvent also enhances the diffusivity of the reactant molecules into and out of the pores of the activated carbon catalyst. This solvent in conjunction with the activated carbon acts as a source of hydrogen and this activated carbon exhibits a selective cracking ability, but by a different mechanism than the usual acid-type cracking catalyst. It has been found that the activated carbon together with the hydrocarbon solvent act in a unique way to transfer gaseous hydrogen to the heavy hydrogen-deficient feedstock by a "hydrogen shuttle" mechanism, resulting in a strong and selective hydrogenation function. The product obtained is a very light coloured liquid which is substantially free of pitch (e.g. normally less than 2%).

The combination of hydrogenation function and hydrogen transfer function of the activated carbon results in minimal consumption of solvent. Substantial desulfurization occurs by the cracking/hydrogenation function of the activated carbon. It has been found that coke formation and metal deposition on the activated carbon result only in slow catalyst deactivation even after significant accumulations on the catalyst surface.

BRIEF DESCRIPTION OF THE DRAWINGS

In the drawings which illustrate preferred embodiments of the invention.

DESCRIPTION OF THE PREFERRED EMBODIMENTS

Figure 1:
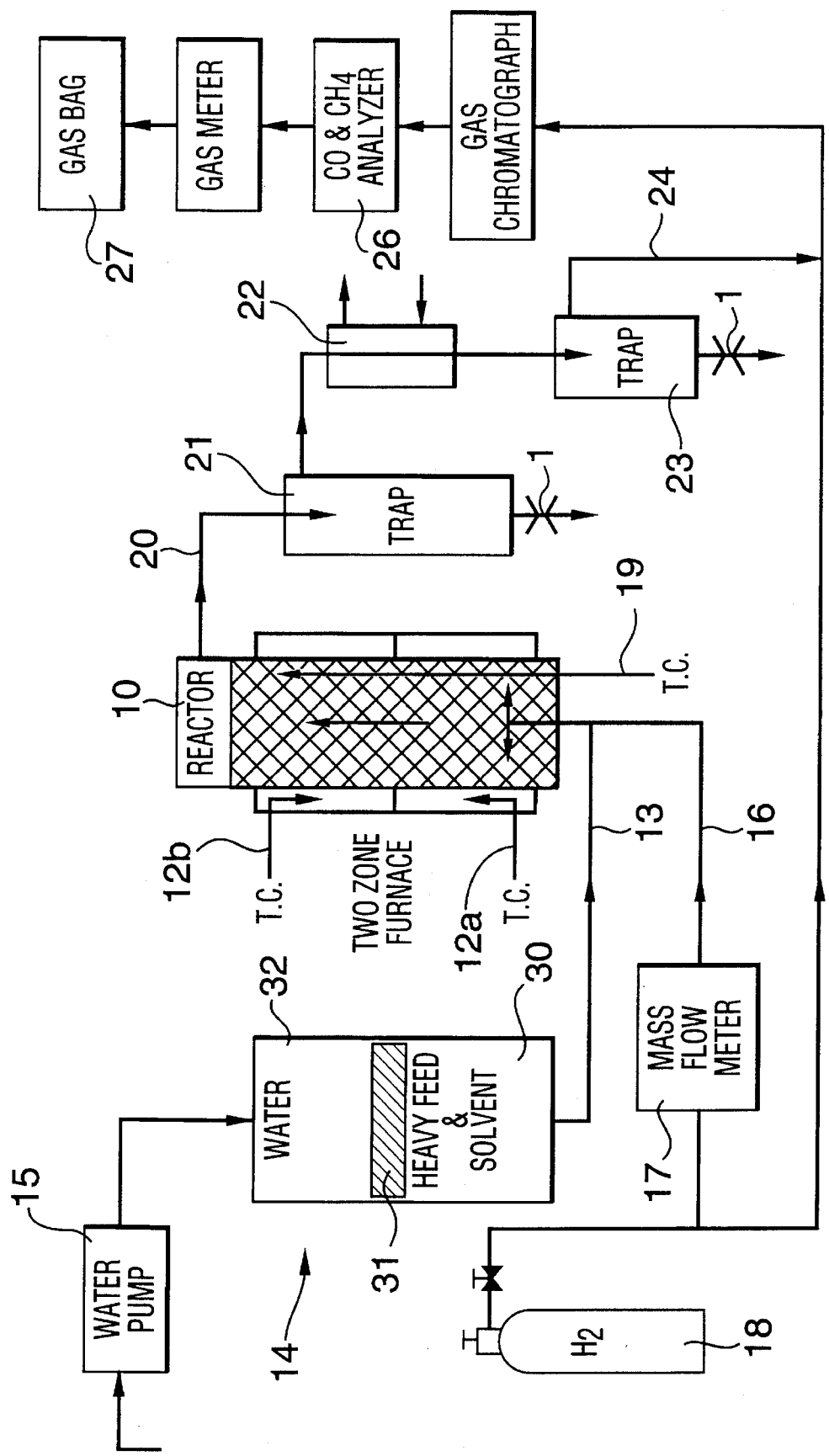
FIG. 1 is a schematic flow diagram of a laboratory reactor.

A schematic diagram of a laboratory apparatus for carrying out the present invention is shown in FIG. 1. The reactor 10 was held in a furnace 11 with two independently controlled heating zones with thermocouples 12a and 12b. The reactor temperature was measured by thermocouple 19.

The reactor 10 was operated in an up flow mode for both gas and liquid feed. The hydrocarbon feed 13 was metered by water displacement from a heated cylinder 14 containing a free piston 31 separating the liquid feed 30 and water 32. The water was pumped at a controlled rate by a modified liquid metering pump 15. Hydrogen 16 was fed from cylinders 18 through a mass flow meter 17. Liquid and gaseous products were removed at the top of the reactor 10 via line 20 directly to a trap 21 and then fed through a cooler 22 to a second trap 23. Non-condensible gases 24 were removed from the second trap 23 and, after pressure reduction, were metered and then passed through an on-line $CO$-$CH_4$ infrared analyzer 26. After another metering, all off-gases were collected in large polyethylene bags 27, sampled and analyzed by GC.

At the initiation of a run, about 55 minutes lapsed before liquid product appeared in the traps. Runs varied in length from 3 hours to several days. The LHSV was generally maintained in the range of about 0.6 to 1.0 $hr^{-1}$. Liquid samples were withdrawn periodically, generally about every 90 minutes, from the trap.

A series of tests were conducted utilizing the above equipment. For these tests, the feedstock was an Athabasca tar sand bitumen generally classed as coker feed bitumen with 62% by volume boiling above 525° C. It had the property shown in Table 1 below:

TABLE 1

| Properties of Syncrude Athabasca Bitumen Coker Feed | |
|---|---|
| API gravity | 7.8 |
| Density | 1.016 |
| Viscosity (cp) | |
| 15° | >700000 |
| 25° | 300000 |
| 60° | 4280 |
| 100° | 287 |
| Ramsbottom Carbon Residue wt % | 14.5 |
| Ash, wt % | 0.81 |
| C | 82.97 |
| H | 10.16 |
| N | 0.44 |
| S | 5.44 |
| O | 0.94 |
| V ppm wt | 218 |
| Ni ppm wt | 83.3 |
| Asphaltenes, wt % | 16.6 |
| Acid No. | 2.04 |

The paraffinic hydrocarbon was N-dodecane. This n-dodecane has a critical temperature of 385.1° C. and a critical pressure of 18 atm, allowing supercritical conditions to be achieved at normal hydrocracking temperatures.

The solid catalyst used was an activated carbon obtained from bituminous coal and is available from Calgon Carbon Corp. under the trademark Filtrasorb 300. This catalyst material had effective particle sizes in the range of 0.8 to 1.0 mm and a total surface area of 900 to 1000 $m^2/g$. Elemental analysis of this material was C 78.4%, H 0.37%, N 1.75%, S 1.87%.

EXAMPLE 1

Three runs were done at different pressures, all with a 1:1 by mass mixture of bitumen and n-dodecane as feed. Hydrogen feed rate was 1220 $m^3$ hydrogen (STP) per $m^3$ of liquid feed. The same weight of catalyst was used in all tests. Results are shown in Table 2 below:

TABLE 2

Reaction Conditions and Yields for Bitumen/Paraffin/Charcoal/$H_2$
System - Effect of Pressure

| Run No. | 15 | 14 | 12 |
|---|---|---|---|
| Temperature | | | |
| Top °C. | 412 | 405 | 405 |
| Middle °C | 459 | 425 | 405 |
| Pressure, MPa | 3.5 | 7.0 | 13.7 |
| Yields, wt % of bitumen fed | | | |
| Liquid | 64.4 | 69.6 | 84.9 |
| $C_1$–$C_4$ gas | 11.6 | 7.7 | 5.0 |
| $H_2S$ | 3.7 | 3.3 | 2.5 |
| Coke | 20.3 | 19.4 | 7.6 |
| Liquid Product (Diluent free) | | | |
| IBP °C. | — | 34 | 67 |
| 10% | — | 208 | 211 |
| 50% | — | 240 | 245 |
| 90% | — | 294 | 420 |
| FBP | — | 356 | 465 |
| Elemental Analysis (Total Liquid Product) | | | |
| C wt % | | | 84.35 |
| H | | | 14.77 |
| N | | | 0.0 |
| S | | | 1.16 |
| Catalyst Analysis | | | |
| C | | | 86.19 |
| H | | | 2.05 |
| N | | | 2.25 |
| S | | | 1.76 |
| % Desulfurization as $H_2S$ | 62.3 | 55.6 | 42.1 |

Liquid product yield increased with hydrogen pressure to 84.9% by weight (over 100% by volume) all boiling in the range of IBP 67° C. to 465° C. FBP, at the maximum pressure of 13.7 MPa, while coke formation decreased by a factor of nearly three, and non-condensible gas production was reduced by 100%. Sulphur removal as $H_2S$ was not quite as good at the higher pressure, but still reached a level of 42% S-removal.

Figure 2:
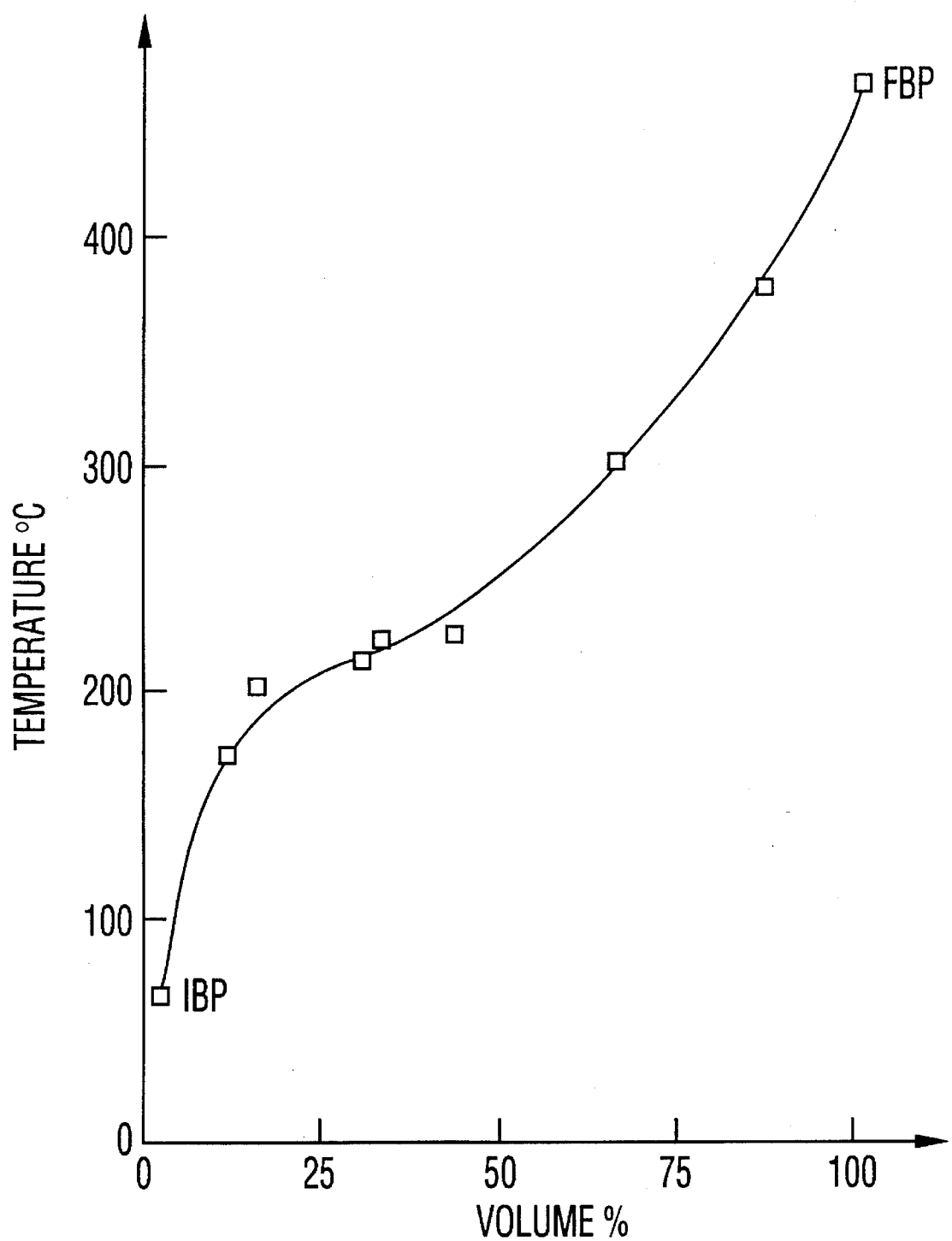
FIG. 2 is a distillation curve.

At an LHSV of approximately 1.0 $hr^{-1}$, over a 24 hour operating period no significant change in catalyst activity was observed. A simulated distillation curve for the liquid product (diluent free basis) from Run 12 is shown in FIG. 2.

Table 2 also shows that the liquid product from Run 12 contained less than 0.1% of nitrogen, so that a high degree of denitrification of the bitumen feed was achieved. Metal analysis of the liquid product showed no detectable nickel or vanadium content, so demetalization of the liquid product was essentially complete. Analysis of the used catalyst from Run 12 showed increased nickel content and large increases in vanadium content. However, despite the deposition of considerable amounts of metals on the activated charcoal, no significant loss in catalytic activity was observed.

EXAMPLE 2

A series of tests were done to evaluate single component effects, and these results are shown in Table 3.

TABLE 3

Effect of Parameters in Bitumen/Paraffin/Charcoal/H2 System

| Run No. | 13 | 16 | 17 | 31 | 29 |
|---|---|---|---|---|---|
| Temperature | | | | | |
| Top °C. | 405 | 400 | 395 | 400 | 370 |
| Middle °C. | 405 | 400 | 395 | 415 | 460 |
| Pressure, MPa | 13.0 | 7.0 | 7.0 | 13.7 | 13.7 |
| Feeds | | | | | |
| Liquid | 1:1 Bitumen:Paraffin | Paraffin | Paraffin | 1:1 Bitumen:Paraffin | Bitumen |
| Gas | $H_2$ | $H_2$ | $N_2$ | $N_2$ | $H_2$ |
| Catalyst | None | Charcoal | Charcoal | Charcoal | Charcoal |

TABLE 3-continued

Effect of Parameters in Bitumen/Paraffin/Charcoal/H2 System

| Run No. | 13 | 16 | 17 | 31 | 29 |
|---|---|---|---|---|---|
| Yields, wt % of bitumen fed | | | | | |
| Liquid | 90.3 | 98.6 | 98.1 | 67.4 | 85.5 |
| $C_1$–$C_4$ gas | 0.3 | 0.2 | 0.4 | 4.9 | 5.8 |
| $H_2S$ | 0.3 | — | — | 0.6 | 1.6 |
| Coke | 9.1 | 1.2 | 1.5 | 25.8 | 8.9 |
| Product analysis | Lightly cracked bitumen + dodecane, S = 2.80% | Dodecane | Dodecane | Rapid Catalyst Deactivation | Accelerated Coking, Deactivation |

For Runs 13, 31, 29 Yields are wt % of bitumen fed (diluent-free)

In Run 13 a bitumen/dodecane/$H_2$ system was used with no catalyst and maintaining the same LHSV as in the catalytic Run 12. This test of the bitumen/dodecane feed with no activated charcoal present (Run 13) when compared to Run 12 of Table 2 shows the essential role of this catalyst in hydrogen transfer reactions, and its effectiveness in supercritical fluid.

Dodecane alone was passed through the reactor also in the presence of activated charcoal, with hydrogen gas and with an inert gas ($N_2$) in two other tests (Runs 16 and 17). It is clear that at reaction conditions, with or without hydrogen, dodecane is essentially unreacted. Less than 2% by weight is converted, apparently mainly by cracking, to $H_2$ and heavier components. Comparison of Runs 16 and 17 using $H_2$ or $N_2$ shows clearly the low cracking and hydrogenation activity of the activated charcoal in the presence of a saturated paraffin alone.

Comparison of Run 12 with Run 31 indicates the essential role of hydrogen in producing high liquid yields, in reducing coke formation, and in better sulphur removal. In Run 31 without hydrogen the catalyst quickly deactivated and the liquid product quality degraded badly over eight hours of operation.

Comparison of Run 29 with no supercritical paraffin solvent with Run 12 of Table 2 shows that overall liquid yield is not changed significantly by the absence of dodecane. However, the character of the liquid degraded rapidly with time and coke formation accelerated so that the catalyst was largely deactivated after 10 hours of operation.

Results in Table 3 show clearly that the paraffinic solvent is not significantly consumed in the reaction, which is a novel aspect of this invention, thus allowing the solvent to be separated from the liquid products by distillation and recycled without further treatment or upgrading. The necessity for the use of both hydrogen and the activated charcoal catalyst even at supercritical conditions for the solvent is clear from Runs 31 and 29, if a high yield of a high quality liquid product is to be obtained and if catalyst activity is to be maintained for longer periods.

EXAMPLE 3

Results of two typical tests to determine the effect of amount and type of solvent are shown in Table 4 together with results from Run 12.

TABLE 4

Effect of Solvent Ratio and Type in Bitumen/Paraffin/Charcoal/Hydrogen System

| Run No. | 30 | 32 | 12 |
|---|---|---|---|
| Temperature | | | |
| Top °C. | 405 | 360 | 405 |
| Middle °C. | 400 | 430 | 405 |
| Pressure, MPa | 13.7 | 13.7 | 13.7 |
| Feed | | | |
| Liquid | Bitumen 72% Dodecane 28% | Bitumen 74% Dodecane 13% Toluene 13% | Bitumen 50% Dodecane 50% |
| Gas | $H_2$ | $H_2$ | $H_2$ |
| Catalyst | Act.charcoal | Act.charcoal | Act.charcoal |
| Yields, wt % of bitumen fed | | | |
| Liquid* | 85.9 | 84.0 | 87.4 |
| $C_1$–$C_4$ gas | 8.2 | 7.2 | 5.0 |
| $H_2S$ | 2.0 | 1.8 | 2.5 |
| Coke | 6.2 | 7.1 | 5.6 |
| % S removal as $H_2S$ | 35.3 | 30.7 | 42.1 |

*Liquid hold-up in reactor in these values.

Comparison of Runs 12 and 30 with different amounts of dodecane in hydrogen shows that Run 30 with less dodecane gave slightly lower yields of liquids. In Run 30 after eighteen hours the first signs of catalyst deactivation were appearing as shown by some change in product quality to larger amounts of high BP components, while this was not the case for Run 12. Run 12 also showed a higher level of sulphur removal, and slightly less coke formation.

Run 32 in which an aromatic solvent (toluene) was added along with dodecane did not show any improvement in liquid yield or quality although supercritical conditions were maintained. Coke yield increased slightly and sulphur removal decreased. The reduction in conversion performance is due to the differences in ease of hydrogen transfer to activated carbon among different solvents. The addition of the aromatic solvent, toluene, did not improve the conversion of asphaltenes to lighter products.

EXAMPLE 4 (Run #40)

A test was conducted using the same bitumen and catalyst as in Example 1 and using the same general procedure. However, the paraffinic hydrocarbon used was hexadecane having a critical temperature of 444° C.

Sixteen samples were taken over 24 hours as shown in Table 5 below:

TABLE 5

Run #40: Details of Sampling

| Sample No. | Time (min.) | Vol. Fed (cm³) | Liq. Product (g) |
|---|---|---|---|
| 1 | 90 | 41.3 | 38.19 |
| 2 | 180 | 41.6 | 35.54 |
| 3 | 270 | 41.4 | 34.96 |
| 4 | 362 | 42.3 | 35.74 |
| 5 | 452 | 41.4 | 35.43 |
| 6 | 542 | 41.3 | 35.36 |
| 7 | 638 | 44.2 | 37.63 |
| 8 | 730 | 42.4 | 35.94 |
| 9 | 820 | 41.3 | 36.99 |
| 10 | 912 | 42.5 | 43.47 |
| 11 | 1004 | 42.2 | 29.18 |
| 12 | 1094 | 41.4 | 35.22 |
| 13 | 1184 | 41.3 | 34.92 |
| 14 | 1279 | 41.2 | 35.22 |
| 15 | 1366 | 42.5 | 36.31 |
| 16 | 1461 | 43.8 | 37.15 |
|  |  | 672.1 | 577.25 |

The processing conditions and results obtained are shown in Table 6 below:

TABLE 6

| Run No. | 40 | |
|---|---|---|
| Time Interval (min) | 180–542 | 1094–1461 |
| Temperature |  |  |
| Top °C. | 395 | 395 |
| Middle °C. | 450 | 450 |
| Pressure, MPa | 13.8 | 13.8 |
| H₂ of bitumen fed, consumed, wt % | 1.313 | 1.267 |
| Yields, wt % of bitumen fed |  |  |
| Liquid | 93.21 | 93.30 |
| C₁–C₅ gas | 2.79 | 2.65 |
| H₂S | 1.81 | 1.80 |

EXAMPLE 5 (Run #42)

This test followed the same general procedure as Example 4, with the same bitumen and catalyst. However, for this test the paraffinic hydrocarbon used was n-decane having a critical temperature of 344.6° C. and a boiling temperature of 174.2° C.

As in Example 4, 16 samples were collected over about 24 hours as shown in Table 7 below:

TABLE 7

Run #42: Details of Sampling

| Sample No. | Time (min.) | Vol. Fed (cm³) | Liq. Product (g) |
|---|---|---|---|
| 1 | 54 | 49.6 | 10.39 |
| 2 | 150 | 44.2 | 33.58 |
| 3 | 240 | 41.4 | 32.41 |
| 4 | 330 | 41.5 | 32.94 |
| 5 | 420 | 41.4 | 31.62 |
| 6 | 510 | 41.4 | 33.57 |
| 7 | 600 | 41.4 | 32.42 |
| 8 | 680 | 36.9 | 29.98 |

TABLE 7-continued

Run #42: Details of Sampling

| Sample No. | Time (min.) | Vol. Fed (cm³) | Liq. Product (g) |
|---|---|---|---|
| 9 | 770 | 41.5 | 34.16 |
| 10 | 860 | 41.5 | 33.61 |
| 11 | 950 | 41.5 | 33.16 |
| 12 | 1040 | 41.6 | 33.81 |
| 13 | 1130 | 41.5 | 33.99 |
| 14 | 1220 | 41.5 | 33.26 |
| 15 | 1310 | 41.5 | 34.02 |
| 16 | 1400 | 41.4 | 33.98 |
|  |  | 669.9 | 506.90 |

The processing conditions and results obtained are shown in Table 8 below:

TABLE 8

Run #42: Fractional Yields: 100 g Bitumen Fed

| Time Interval (mins.) | Hydrogen Consumed (g) | Liquid Product (g) | C₁–C₅ (g) | H₂S (g) |
|---|---|---|---|---|
| 390–420 | 1.30 | 81.93 | 5.35 | 2.51 |
| 668–680 | 1.78 | 88.10 | 5.17 | 2.12 |
| 998–1040 | 0.62 | 90.50 | 3.52 | 2.08 |
| 1365–1400 | 0.61 | 91.44 | 3.52 | 1.98 |

EXAMPLE 6 (Run ™48)

Again the same general procedure of Example 4 was used, with the same bitumen and catalyst. The paraffinic hydrocarbon used was a commercial solvent from Esso Chemical Canada under the name VARSOL DX 3641 Solvent. Varsol is a mixture with a maximum boiling point of about 210° C. and contains about 94% paraffins and naphthenes.

Over the test period, 21 samples were collected as shown in Table 9 below:

TABLE 9

Run #48 Details of Sampling

| Sample No. | Time (min.) | Vol. Fed (cm³) | Liq. Product (g) |
|---|---|---|---|
| 1 | 54.5 | 50 | 7.93 |
| 2 | 68.5 | 6 | 8.83 |
| 3 | 148 | 36.8 | 28.48 |
| 4 | 238 | 41.2 | 34.28 |
| 5 | 328 | 41.2 | 34.92 |
| 6 | 418 | 41.4 | 34.60 |
| 7 | 508 | 41.3 | 35.55 |
| 8 | 600 | 42.2 | 34.85 |
| 9 | 690 | 41.2 | 39.07 |
| 10 | 780 | 41.2 | 33.84 |
| 11 | 870 | 41.4 | 35.16 |
| 12 | 967 | 44.4 | 38.04 |
| 13 | 1057 | 41.3 | 34.99 |
| 14 | 1147 | 41.4 | 35.75 |
| 15 | 1237 | 41.2 | 35.54 |
| 16 | 1327 | 41.2 | 35.17 |
| 17 | 1401 | 33.9 | 29.14 |
| 18 | 1491 | 41.3 | 36.80 |
| 19 | 1581 | 41.2 | 35.04 |
| 20 | 1671 | 41.3 | 35.26 |
| 21 | 1761 | 41.3 | 34.91 |

TABLE 9-continued

| | Run #48 Details of Sampling | | |
|---|---|---|---|
| Sample No. | Time (min.) | Vol. Fed (cm³) | Liq. Product (g) |
| | | 832.4 | 678.15 |

The gas consumption is shown in Table 10 below:

TABLE 10

| | Run #48: Gas Compositions (Volume %) | | | | |
|---|---|---|---|---|---|
| | Time Interval (min.) | | | | |
| | 263–294 | 548–568 | 901–938 | 1282–1312 | 1630–1655 |
| $CH_4$ | 1.70 | 1.63 | 1.78 | 1.88 | 1.52 |
| $C_2H_6$ | 0.59 | 0.58 | 0.61 | 0.64 | 0.54 |
| $C_3H_8$ | 0.27 | 0.28 | 0.28 | 0.28 | 0.25 |
| $C_4$–$C_5$ | 0.12 | 0.13 | 0.15 | 0.23 | 0.12 |
| $H_2S$ | 0.83 | 0.82 | 0.75 | 0.81 | 0.85 |

The processing conditions and results obtained are shown in Table 11 below:

TABLE 11

| | Run No. 48 | | | | |
|---|---|---|---|---|---|
| Time Interval (mins.) | 68.5–328 | 328–600 | 780–1057 | 1057–1401 | 1401–1761 |
| Temperature | | | | | |
| Top °C. | 366 | 366 | 366 | 366 | 366 |
| Middle °C. | 464 | 464 | 464 | 464 | 464 |
| Pressure, MPa | 13.7 | 13.7 | 13.7 | 13.7 | 13.7 |
| $H_2$ consumed, wt % | 1.69 | 1.46 | 1.46 | 1.74 | 1.33 |
| Yields, wt % of bitumen fed | | | | | |
| Liquid | 83.13 | 87.87 | 90.21 | 92.15 | 92.22 |
| $C_1$–$C_5$ gas | 4.18 | 3.99 | 4.10 | 4.35 | 3.82 |
| $H_2S$ | 2.01 | 1.90 | 1.65 | 1.87 | 2.04 |
| Apparent Reactor Accumulation* | 12.37 | 7.71 | 5.50 | 3.37 | 3.26 |

*by difference

The above examples show four different supercritical solvents, all of which are predominantly paraffinic, isoparaffinic or cyclic paraffinic and hydrogen-rich solvents. They all provided similar yields of products. These results clearly show that any hydrogen-rich hydrocarbon mixture with an appropriate boiling range can be used as solvent for the process of the present invention.

We claim:

1. A process for hydrotreating a heavy hydrocarbon oil to form lower boiling materials, which comprises adding to the heavy hydrocarbon oil a hydrogen-rich hydrocarbon solvent selected from the group consisting of paraffins, isoparaffins and cyclic paraffins and having a critical temperature of less than 500° C. to thereby form a diluted feedstock mixture and subjecting said feedstock mixture to hydrotreating in the presence of activated carbon catalyst without added catalytic metals at a temperature and pressure substantially at or greater than the critical temperature and pressure of the solvent.

2. A process as claimed in claim 1 wherein the solvent is added to the heavy hydrocarbon oil in an amount of 20–200% by volume based on the original feed.

3. A process as claimed in claim 2 wherein the solvent has a critical temperature below 450° C.

4. A process as claimed in claim 3 wherein the feedstock mixture contains 25–100% by volume of solvent based on the original feed and the temperature is in the range of 350° C. to 450° C.

5. A process as claimed in claim 1 wherein the ratio of operating temperature to critical temperature is in the range of 0.9–1.3.

6. A process as claimed in claim 5 wherein the total operating pressure is in the range of 10–20 MPa.

7. A process as claimed in claim 1 wherein the solvent is a paraffin solvent selected from the group consisting of decane, dodecane and hexadecane.

8. A process as claimed in claim 1 wherein the solvent is a naphthene.

9. A process as claimed in claim 1 wherein the solvent is a mixture of paraffins and cyclic paraffins.

10. A process as claimed in claim 1 wherein the heavy hydrocarbon oil has a boiling point of at least 200° C.

11. A process as claimed in claim 10 wherein the heavy hydrocarbon oil contains at least 50 volume percent of material boiling above 350° C.

12. A process as claimed in claim 10 wherein the heavy hydrocarbon oil contains at least 50 volume percent of material boiling above 450° C.

* * * * *